(12) United States Patent
Mai

(10) Patent No.: US 6,434,838 B1
(45) Date of Patent: Aug. 20, 2002

(54) PROTECTIVE SHEATH FOR SAW TEETH OF A HANDSAW

(76) Inventor: Hsiao-feng Mai, No. 17 Chaun-Yuan Street, Taichung City (TW)

( * ) Notice: Subject to any disclaimer, the term of this patent is extended or adjusted under 35 U.S.C. 154(b) by 0 days.

(21) Appl. No.: 09/933,747

(22) Filed: Aug. 22, 2001

(51) Int. Cl.⁷ .............................................. B27B 21/00
(52) U.S. Cl. .............................. 30/504; 30/514; 30/151
(58) Field of Search ................................ 30/151, 296.1, 30/504, 514; 248/37.3; D8/95

(56) References Cited

U.S. PATENT DOCUMENTS

| | | | | |
|---|---|---|---|---|
| 757,740 A | * | 4/1904 | Happe | 30/504 |
| 1,803,463 A | * | 5/1931 | Danielson | 30/514 |
| 2,439,568 A | * | 4/1948 | Hall | 30/504 |
| 2,792,163 A | * | 5/1957 | Kidwell | 30/504 |
| 2,853,106 A | * | 9/1958 | Kanthack | 30/514 |
| 4,942,663 A | * | 7/1990 | Ray, Sr. | 30/151 |
| 5,011,102 A | * | 4/1991 | Kiefer | 248/37.3 |
| D383,961 S | * | 9/1997 | Scales, III | D8/95 |
| 6,076,261 A | * | 6/2000 | Eriksson et al. | 30/151 |

* cited by examiner

*Primary Examiner*—Hwei-Siu Payer
(74) *Attorney, Agent, or Firm*—Rosenberg, Klein & Lee

(57) ABSTRACT

Protective sheath for saw teeth of a handsaw, including a base section, a protective slat and multiple magnetic members. The base section has an upper edge and a lower edge marked with British and metric system scales. The protective slat integrally extends from the lower edge of the base section to define a protective slot. The multiple magnetic members are inlaid in the base section beside the protective slot at predetermined positions for attracting the saw blade. This invention has a better attractively fixing effect. The protective sheath is applicable to different kinds of handsaws with various patterns of handles. In addition, the protective sheath also serves as a ruler.

5 Claims, 5 Drawing Sheets

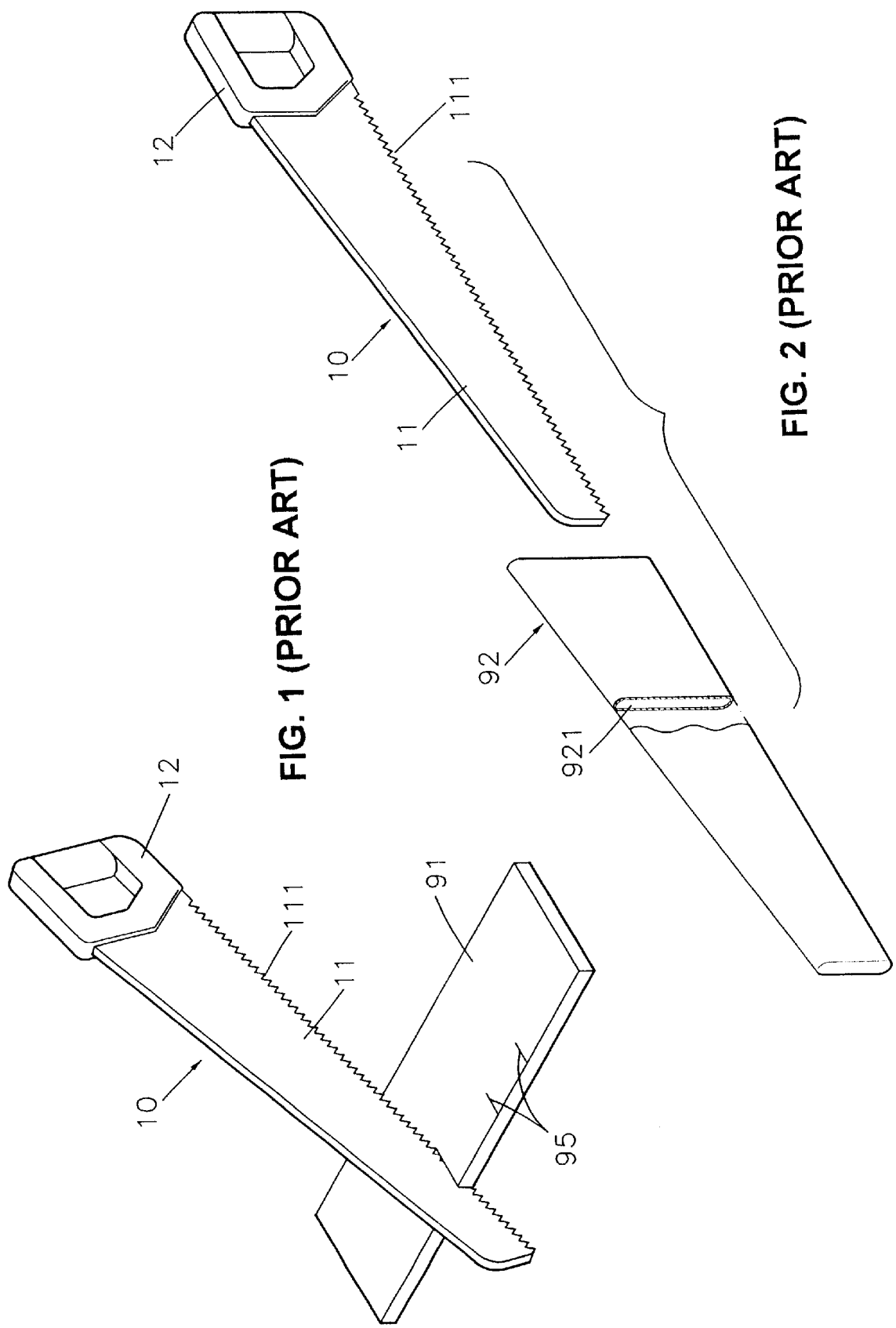

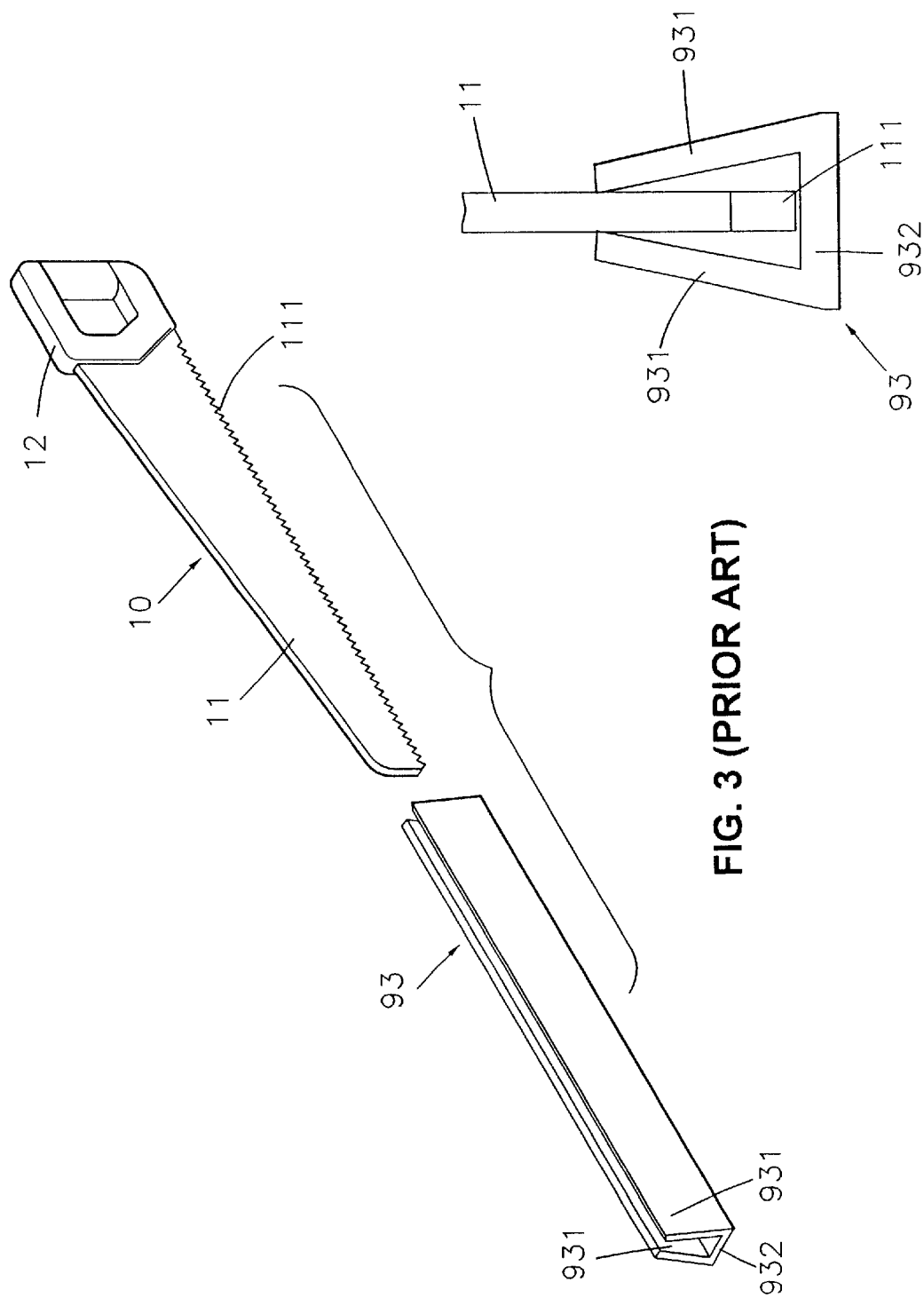

PROTECTIVE SHEATH FOR SAW TEETH OF A HANDSAW

BACKGROUND OF THE INVENTION

The present invention is related to a protective sheath for saw teeth of a handsaw. The protective sheath has a better attractively fixing effect. The protective sheath is applicable to different kinds of handsaws with various patterns of handles. In addition, the protective sheath also serves as a ruler.

FIG. 1 shows a conventional hand saw 10 including a saw blade 11 and a handle 12. The bottom edge of the saw blade 11 is formed with a row of saw teeth 111. In working, a wooden work piece 91 is first marked with a line 95 by a ruler (not shown) and then sawed by the hand saw 10.

The saw teeth 111 are very sharp and are likely to injure people. In order to avoid unexpected injury of people prior to use (during transferring or exhibition) or after use (in storage), two conventional measures are available as follows:

1. As shown in FIG. 2, a paper sheath 92 having an interior space 921 is used to receive the saw blade 11 of the hand saw 10.
2. As shown in FIG. 3, a plastic clip envelope 93 has a bottom wall 932 and a pair of clipping walls 931 integrally upward extending from the bottom wall 932. The saw blade 11 can be fitted between the clipping walls 931 and clamped thereby. Accordingly, the saw teeth 111 are enclosed in the clip envelope 93 without exposed to outer side.

In actual use, the sheath 92 of FIG. 1 is paper-made and is subject to thrust of the saw teeth 111 or softening and damage due to oil or water. Once the sheath 92 is broken, it cannot provide any protective function and a user's hand or body is very possible to be cut by the saw teeth 111.

With respect to the second measure, the clip envelope is able to resiliently clamp and fix the saw blade 11. However, it is difficult to fit the saw blade into the clip envelope and the clipping force thereof is often insufficient. The gap between the top edges of the clipping walls 931 must be smaller than the thickness of the saw blade 11 for achieving a better clipping force. However, when fitting the saw blade 11 into the clip envelope, the top edges of the clipping walls 931 will scrape the saw blade 11. Furthermore, after a period of use, the clipping force will be declined and the saw blade is easy to detach from the clip envelope.

In addition, when marking the wooden work piece 91, it is necessary to additionally prepare a ruler. In the case that no ruler is available (or the user forgot to bring it), it will be hard to precisely mark the work piece with a line 95. This makes it difficult to accurately saw the work piece.

SUMMARY OF THE INVENTION

It is therefore a primary object of the present invention to provide a protective sheath for saw teeth of a handsaw. The protective sheath includes multiple magnetic members for achieving better attractively fixing effect.

It is a further object of the present invention to provide the above protective sheath in which the rear end of the base section is formed with a recess to which different patterns of handles are adaptable.

It is a further object of the present invention to provide the above protective sheath which also serves as a ruler.

The present invention can be best understood through the following description and accompanying drawings wherein:

BRIEF DESCRIPTION OF THE DRAWINGS

FIG. 1 is a perspective view of a conventional handsaw, showing the use thereof.

FIG. 2 is a perspective view of the conventional protective sheath of the handsaw.

FIG. 3 is a perspective view of the conventional plastic clip envelope and the handsaw.

FIG. 4 shows that the saw blade of the handsaw is clamped by the conventional clip envelope.

DETAILED DESCRIPTION OF THE PREFERRED EMBODIMENTS

Figures 5, 6:
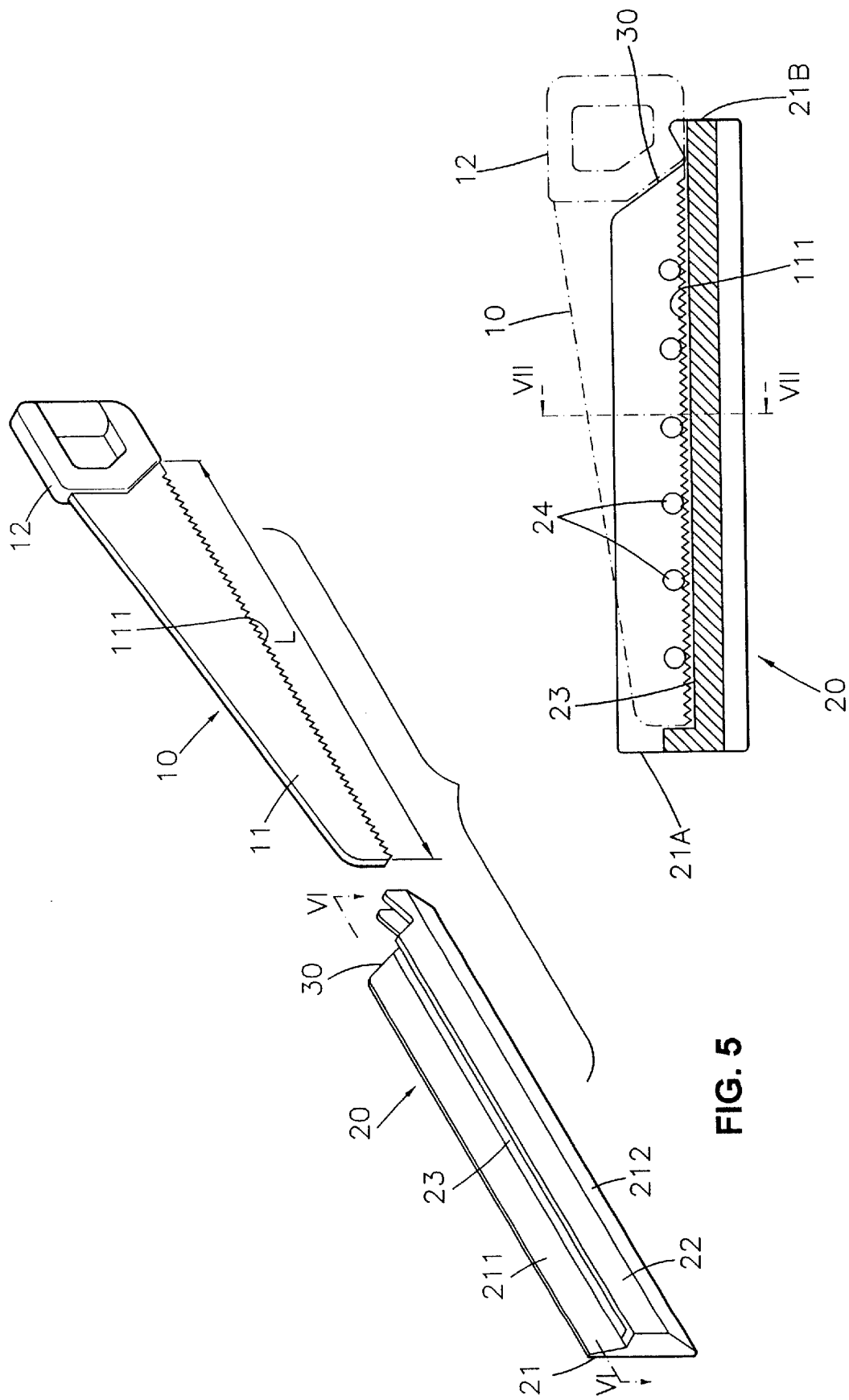
FIG. 5 is a perspective view of the present invention.
FIG. 6 is a longitudinal sectional view of the present invention.
Figure 8:
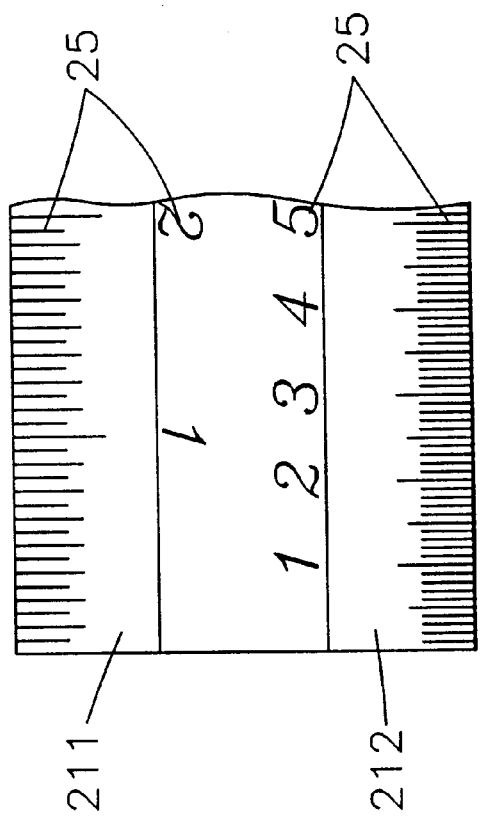
FIG. 8 is an enlarged view of a part of the present invention.
Figure 7:
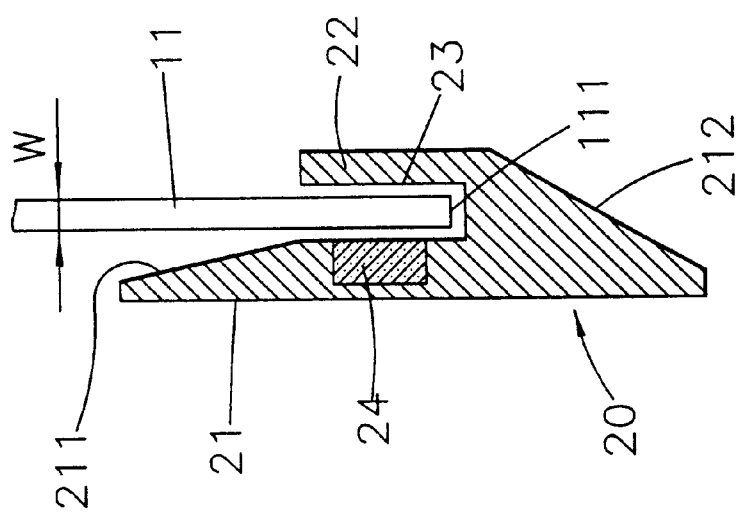
FIG. 7 is a cross-sectional view of the present invention.

Please refer to FIGS. 5 to 8. The protective sheath 20 for saw teeth of the present invention includes a base section 21, a protective slat 22 and multiple magnetic members 24.

The base section 21 is substantially an elongated board having a front end 21A and a rear end 21B. In addition, the base section 21 has an upper edge 211 and a lower edge 212 marked with British and metric system scales 25 for facilitating measurement and marking.

The protective slat 22 integrally extends from the lower edge 212 of the base section 21 substantially in parallel to the base section 21. A protective slot 23 is defined between the base section 21 and the protective slat 22, having a length equal to or larger than the length L of the saw teeth of the saw blade 11. The width of the protective slot 23 is slightly larger than the thickness W of the saw blade 11 of the hand saw 10.

The magnetic members 24 are inlaid in the base section 21 beside the protective slot 23 at predetermined positions for attracting the saw blade 11.

The width of the protective slot 23 is slightly larger than the thickness W of the saw blade 11 so that when fitting the saw blade 11 into the protective sheath, the saw teeth 111 will not scrape the wall of the protective slot 23. Therefore, the using life of the protective sheath can be prolonged.

After the saw blade 11 enters the protective slot 23, the magnetic members 24 will strongly attract the saw blade 11 and prevent the saw blade 11 from detaching from the protective slot 23.

Figure 10:
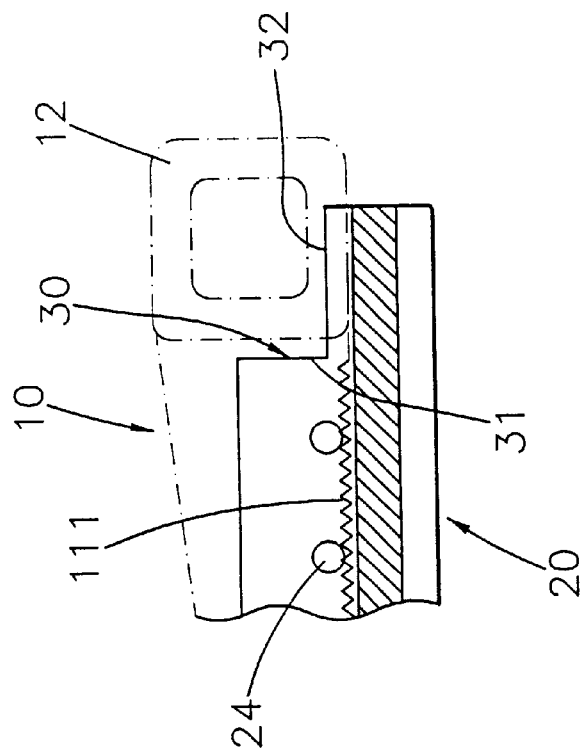
FIG. 10 shows another application of the second embodiment of the present invention.
Figure 9:
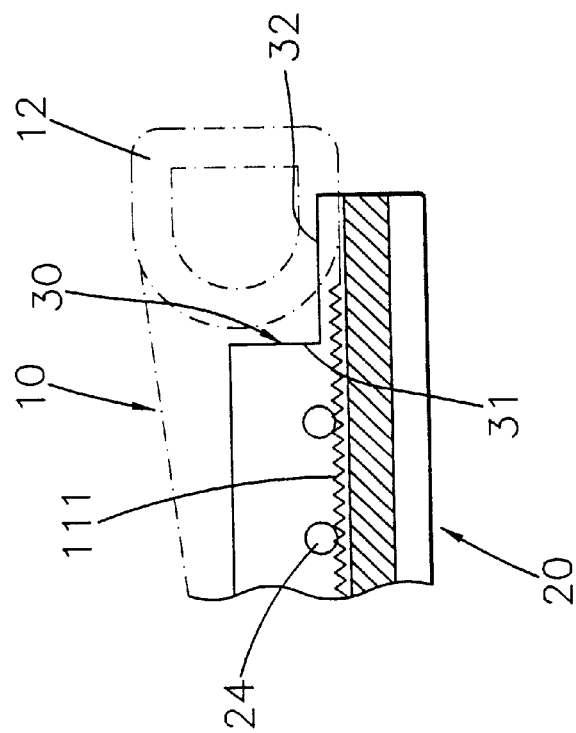
FIG. 9 shows an application of a second embodiment of the present invention.

The rear end 21B of the base section 21 is formed with a recess 30 which can be an oblique opening as shown in FIG. 6 or a stepped opening as shown in FIGS. 9 and 10. With respect to the stepped opening, no matter whether the lower portion of the handle 12 is a slope (as shown in FIG. 6), an arch (as shown in FIG. 9) or a straight line (as shown in FIG. 10), the handle 12 can be adapted to the stepped opening. Therefore, the protective sheath is applicable to various kinds of handsaws. The stepped opening can have a vertical side 31 and a horizontal side 32 containing an angle of 90 degrees for facilitating drafting of a vertical or a horizontal mark.

The protective sheath is marked with British and metric system scales 25 so that it also serves to a ruler in cooperation with the handsaw for marking. In case that the hand saw 10 is damaged, the protective sheath can be solely used as ruler. Practically, the upper edge 212 and lower edge 213 are preferably slopes, especially when the protective sheath is used as a ruler. This facilitates drafting of a line and observation of the scale. Also, this improves the appearance of the protective sheath.

In conclusion, the present invention has the following advantages:

1. The present invention has a better attractively fixing effect. The magnetic members 24 are inlaid in the wall of the protective slot 23 for attracting the saw blade 11 and achieving a better fixing effect.
2. The protective sheath is applicable to different kinds of handsaws with various patterns of handles. The rear end 21B of the base section 21 is formed with a recess 30 to which different patterns of handles 12 are adaptable. Therefore, the application range of the protective sheath of the present invention is wider.
3. The protective sheath also serves as a ruler. The protective sheath is marked with British and metric system scales so that in sawing operation, a user can easily measure and mark a work piece without additionally carrying a ruler.

The above embodiments are only used to illustrate the present invention, not intended to limit the scope thereof. Many modifications of the above embodiments can be made without departing from the spirit of the present invention.

What is claimed is:

1. A protective sheath for saw teeth of a handsaw, comprising:
    a base section which is substantially an elongated board having a front end and a rear end, the base section further having an upper edge and a lower edge marked with British and metric system scales;
    a protective slat integrally extending from the lower edge of the base section substantially in parallel to the base section, a protective slot being defined between the base section and the protective slat, the protective slot having a length equal to or larger than the length of the saw teeth of a saw blade of the handsaw, a width of the protective slot being slightly larger than the thickness of the saw blade of the handsaw; and
    multiple magnetic members inlaid in the base section beside the protective slot at predetermined positions for attracting the saw blade.

2. The protective sheath for saw teeth of a handsaw as claimed in claim 1, wherein the rear end of the base section is formed with a recess.

3. The protective sheath for saw teeth of a handsaw as claimed in claim 2, wherein the recess is an oblique opening.

4. The protective sheath for saw teeth of a handsaw as claimed in claim 2, wherein the recess is a stepped opening having a vertical side and a horizontal side containing an angle of approximately 90 degrees.

5. The protective sheath for saw teeth of a handsaw as claimed in claim 1, wherein the upper edge and lower edge are slopes.

* * * * *